United States Patent
Obikane (12) 
(10) Patent No.: US 6,404,818 B1
(45) Date of Patent: Jun. 11, 2002

(54) VIDEO TRANSMISSION DEVICE AND ITS METHOD

(75) Inventor: Nobuhisa Obikane, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/234,169

(22) Filed: Jan. 19, 1999

(30) Foreign Application Priority Data

Jan. 20, 1998 (JP) .......................................... 10-009094

(51) Int. Cl.⁷ ............................................... H04N 7/12

(52) U.S. Cl. ................................. 375/240.28; 348/500

(58) Field of Search ................................ 386/125, 126, 386/95, 109; 375/240.28; 348/500, 505, 521, 545, 547, 467, 466, 390, 461, 423.1; 370/389, 401, 468, 498; H04N 7/12

(56) References Cited

U.S. PATENT DOCUMENTS

| | | | | |
|---|---|---|---|---|
| 5,517,250 A | * | 5/1996 | Hoogenboom et al. | 348/467 |
| 5,621,840 A | * | 4/1997 | Kawamura et al. | 386/68 |
| 5,732,185 A | * | 3/1998 | Hirayama et al. | 386/70 |
| 5,856,973 A | * | 1/1999 | Thomson | 370/389 |
| 5,884,004 A | * | 3/1999 | Sato et al. | 386/98 |

* cited by examiner

Primary Examiner—Nhon Diep
(74) Attorney, Agent, or Firm—Frommer Lawrence & Haug LLP; William S. Frommer (57) ABSTRACT

In a video transmission device, a plurality of video data associated with one program can be transmitted without a complicated processing at the time of reception. In the case of transmitting a plurality of associated video data, first program information to control the plurality of associated video data as one program is formed and transmitted, so that the plurality of video data associated with one program can be transmitted without a complicated processing.

8 Claims, 10 Drawing Sheets

PROGRAM NUMBER[0] → PID=N
PROGRAM NUMBER[1] → PID=A
⋮ ⋮
PROGRAM NUMBER[X] → PID=XX

FIG. 7(RELATED ART)

PROGRAM NUMBER X
  PID OF VIDEO DATA=XV
  PID OF AUDIO DATA=XA
  PID OF TEXT DATA=XD
  PID OF CLOCK INFORMATION=XC

```
PROGRAM NUMBER X

PID OF LOW ANGLE VIDEO DATA    = XV1
    PID OF MIDDLE ANGLE VIDEO DATA = XV2
    PID OF HIGH ANGLE VIDEO DATA   = XV3
    PID OF AUDIO DATA              = XA
    PID OF CLOCK INFORMATION       = XC
```

VIDEO TRANSMISSION DEVICE AND ITS METHOD

BACKGROUND OF THE INVENTION

1. Field of the Invention

The present invention relates to a video transmission device and its method and more particularly, is suitably applied to a digital broadcasting system.

2. Description of the Related Art

A digital broadcasting system for multiplexing coded video and audio data to transmitting them through a satellite circuit has been proposed and become practical use. In this digital system, video data and also audio data are encoded, and by packetizing and multiplexing the coded video and audio data per fixed data unit, transport data (hereinafter, referred to as a transport stream) is formed and transmitted through such as a satellite wireless circuit.

Figure 1:
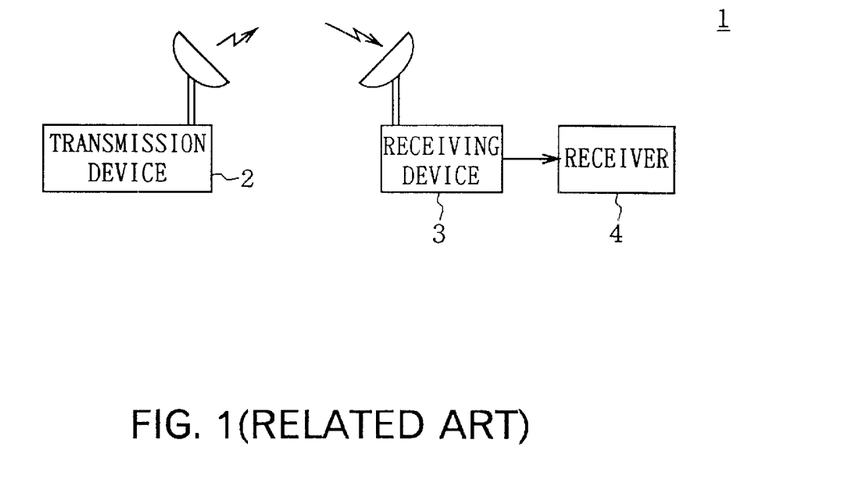
FIG. 1 is a block diagram showing the construction of a digital broadcasting system.

Here, the digital broadcasting system will be described with reference to FIG. 1. As shown in FIG. 1, a digital broadcasting system 1 is roughly comprised of a transmission device 2 to be set in a broadcasting station, a receiving device 3 and a television receiver 4 to be installed in each house. Transport stream data to be transmitted from the transmission device 2 is received by the receiving device 3, and by sending out this to the television receiver 4, broadcasting video and audio can be watched.

Figure 2:
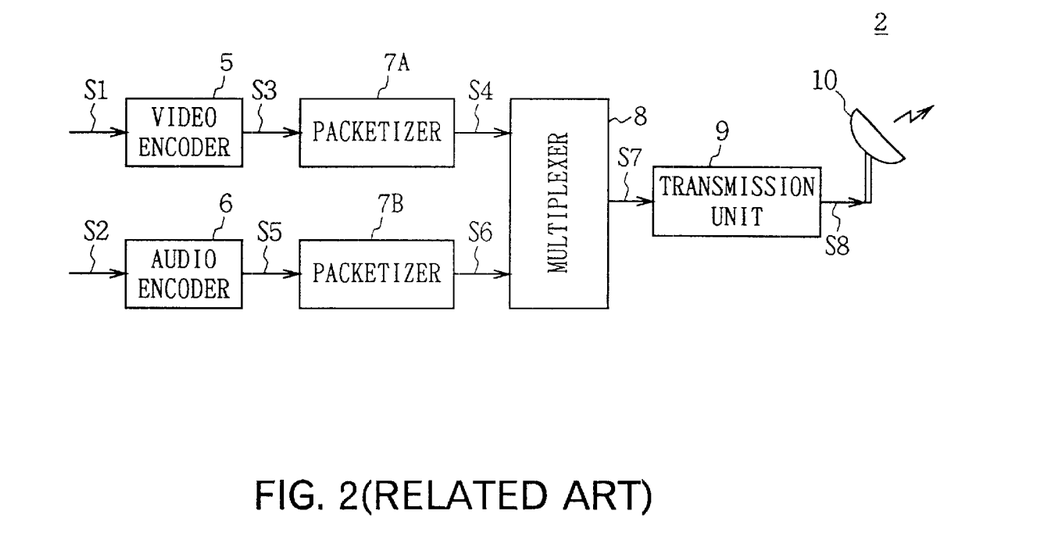
FIG. 2 is a block diagram showing the construction of a conventional transmission device.

As shown in FIG. 2, in the transmission device 2, firstly, video data S1 to be transmitted is entered into a video encoder 5, and audio data S2 accompanying with the video data SI is entered into an audio encoder 6. The video encoder 5 successively encodes the entered video data S1 based on the MPEG2 video encoding system described in the International Standards Regulation ITU-T Recommendation H.262 ISO/IEC13818-2, and outputs a stream of the resulting coded video data S3 (generally, this is called as an elementary stream (ES)) to a packetizer 7A. In the case of encoding the video data S1, the video encoder 5 applies an encoding processing with video data for several pictures, which are called as group of picture (GOP), as a coding unit, and by adding a header consisting of each parameter information at the time of encoding to the head of the coded video data, forms coded video data S3. Thus, a decoding processing can be conducted based on the parameter information of the header at the time of decoding.

Figure 3A:
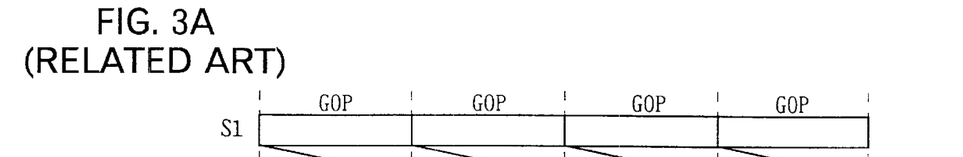
FIGS. 3A and 3B are schematic diagrams explaining the video data encoding.
Figure 3B:
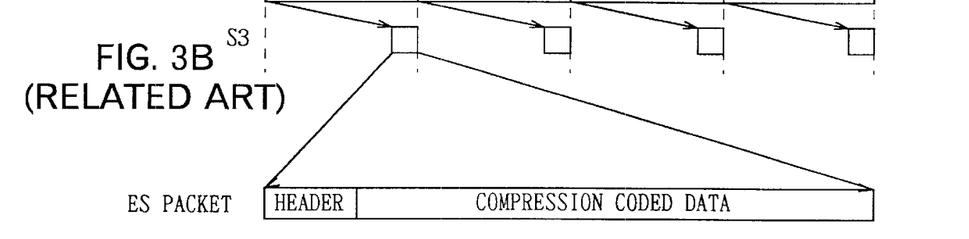

As shown in FIGS. 3A and 3B, the packetizer 7A, by connecting a fixed number of ES packets of coded video data S3 encoded per GOP and adding a packetized elementary stream (PES) header to the head of the packet, PES-packets the coded video data S3 and outputs the PES-packetized coded video data S4 to a multiplexer 8. Note that, data of the PES header consist of time information when reproducing and outputting the video data included in the PES packet at the receiving side (generally, called as presentation time stamp (PTS)), identification information showing the type of elementary stream included in the PES packet (generally, called as a stream ID), and the like. In this connection, such time information PTS is provided in the PES header, so that audio and video can be synchronized and reproduced at the receiving side.

On the other hand, the audio encoder 6 encodes the input audio data S2 based on an audio encoding system described in the International Standards Regulation ITU-T Recommendation H.262 ISO/IEC13181-3 and outputs the resultant coded audio data S5 to a packetizer 7B. Note that, the audio encoder 6 encodes the audio data S2 per fixed number of samples called as an audio frame in the same manner as in the case of video data shown in FIG. 2, and by adding a header comprising parameter information at the time of encoding to the head of the coded audio data, forms an ES-packetized coded audio data S5.

Moreover, the packetizer 7B, by connecting a fixed number of ES packets of the coded audio data S5 encoded per audio frame and adding the PES header to the head of the packet, PES-packetizes the coded audio data S5 and outputs the PES-packetized coded audio data S6 to the multiplexer 8. The data of the PES header are approximately the same as in the case of video.

The multiplexer 8 transport-stream (TS)-packetizes the PES-packetized coded video data S4 and coded audio data S6 by dividing them per fixed data unit respectively, and by switching and outputting the TS packets of the video and audio at established intervals, multiplexes them to form a transport stream S7.

More specifically, as shown in FIGS. 5A, 5B, 6A and 6B, the multiplexer 8,,by dividing each PES packet of the coded video data S4 and coded audio data S6 per 184 bytes and adding a TS header of 4 bytes to each of their heads, forms a TS packet. In this case, the TS header is formed of synchronization information and packet identification information PID showing the type of data included in the TS packet. However, the data part of 184 bytes is not only comprised of PES data but in practice, also additional information is added and these additional information and PES data are adjusted to become 184 bytes altogether. Such data adjusting processing is generally called as a stuffing processing. In this connection, even when PES data are not enough, the stuffing processing is conducted so that data part becomes 184 bytes by adding dummy byte. Then, the multiplexer 8 forms a transport stream S7 by multiplexing thus formed video TS packets onto thus formed audio TS packets.

In this connection, since proper packet identification information PID is added to the multiplexed video and audio TS packet per data, the receiving side can separate the TS packets based on the packet identification information PID to decode video and audio from one multiplexed transport stream.

Thus, the transport stream S7 comprised of video and audio TS packets is transmitted to the succeeding transmission unit 9. The transmission unit 9, after forming a transmission signal by applying the modulation processing to the transport stream S7 for transmitting, forms a transmission signal S8 by applying a frequency conversion processing to the transmission signal of a stated band and transmits this toward the satellite (not shown) via an antenna 10.

A transmission signal S8 relayed via the satellite is received by the receiving device 3 shown in FIG. 1 and the receiving device 3 conducting a reverse processing of the transmission device 2, so that the transmission signal S8 is decoded to the original video and audio data. More specifically, the receiving device 3 applies the frequency conversion processing and demodulation processing to the received signal to restore the transport stream S8 transmitted from the transmission device 2. And then, the receiving device 3 separates video TS packets and audio TS packets based on the packet identification information PID and takes out coded video data and coded audio data from each TS packet separated, and applying the decoding processing to these data, restores video data and audio data transmitted. Thus, these restored video data and audio data are transmitted to the television receiver 4, so that video and audio of the program sent from the transmitter 2 can be watched.

In the foregoing explanation, the transmission device 2 transmits video and audio data forming one program. However, in practice, the transmission device 2 transmits video and audio data of the plural number of programs in the form of one transport stream S8 by TS-packetizing and multiplexing video and audio data of plural programs. Furthermore, in the case where text data are attached to the video data, the text data can also be transmitted in the form of one transport stream S8 by being TS-packetized and multiplexed. In this connection, if the plural programs are multiplexed, the receiving side extracts TS packets of a desired program based on the packet identification information PID added to the TS packets and thus, the video and audio data of the desired program can be restored.

At this point, the processing in the case of multiplexing the plural programs will be described in detail in the following paragraphs. Since the receiving side extracts the TS packets of the desired program based on the packet identification information PID as described above, it is necessary to know the packet identification information PID added to the TS packet of video and audio data of each program. Accordingly, the transmission device 2 TS-packetizes the program information showing the packet identification information PID added to the TS packet of each program, and multiplexes and transmits them onto the video and audio TS packets.

Figure 7:
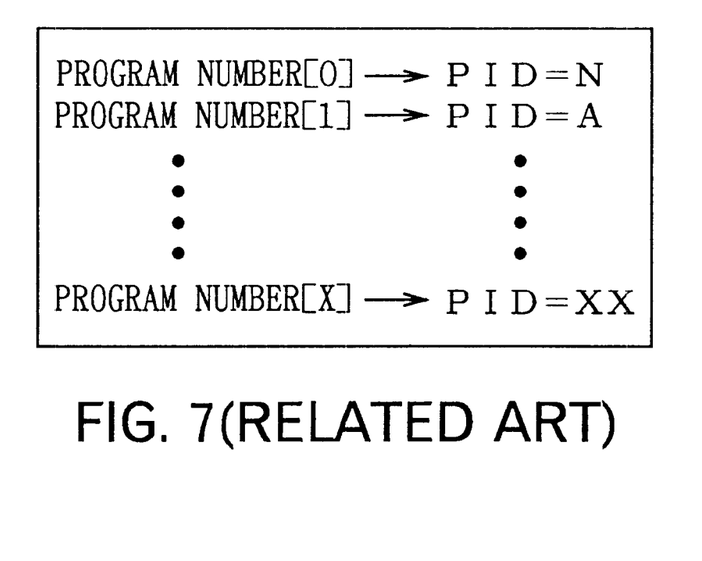
FIG. 7 is a table explaining program information PAT.

In this case, the program information to be transmitted is formed hierarchically, and consists of program information of higher hierarchy called as program association table (PAT) and program information of lower hierarchy called as program map table (PMT). As shown in FIG. 7, the higher hierarchy program information PAT is the information to show the packet identification information PID of TS packet in which the program information PMT formed per program is stored, that is, the information like a table of contents on the program information PMT. Referring to the program information PAT, it is possible to know in which TS packet the program information PMT of each program is stored. For example, it is clear that the program information PMT having the program number "0" is stored in the TS packet having the packet identification information PID "N". Note that, "0" is added to the TS packet storing the program information PAT as the packet identification information PID. Thus, the receiving side, extracting the TS packet whose packet identification information PID is "0" from the transport stream received and decoding it, can obtain the program information PAT.

Figure 8:
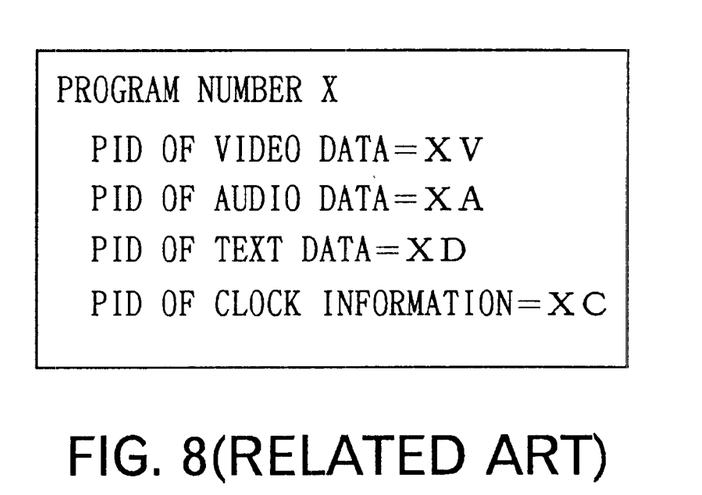
FIG. 8 is a table explaining program information PMT.

On the other hand, as shown in FIG. 8, the program information PMT is the information to show the packet identification information PID of TS packet in which each data forming the program is stored, per program and is the detailed program information formed per program. Accordingly, by referring to the program information PMT, it is possible to know in which TS packet each data forming the program is stored. For example, it is clear that the video data having the program number "X" is stored in the TS packet having the packet identification information PID "XV", and the audio data having the program number "X" is stored in the TS packet having the packet identification information PID "XA". Further, the text data having the program number "X" is stored in the TS packet having the packet identification information "XD", and the clock information having the program number "X" is stored in the TS packet having the packet identification information PID "XC".

Figure 9:
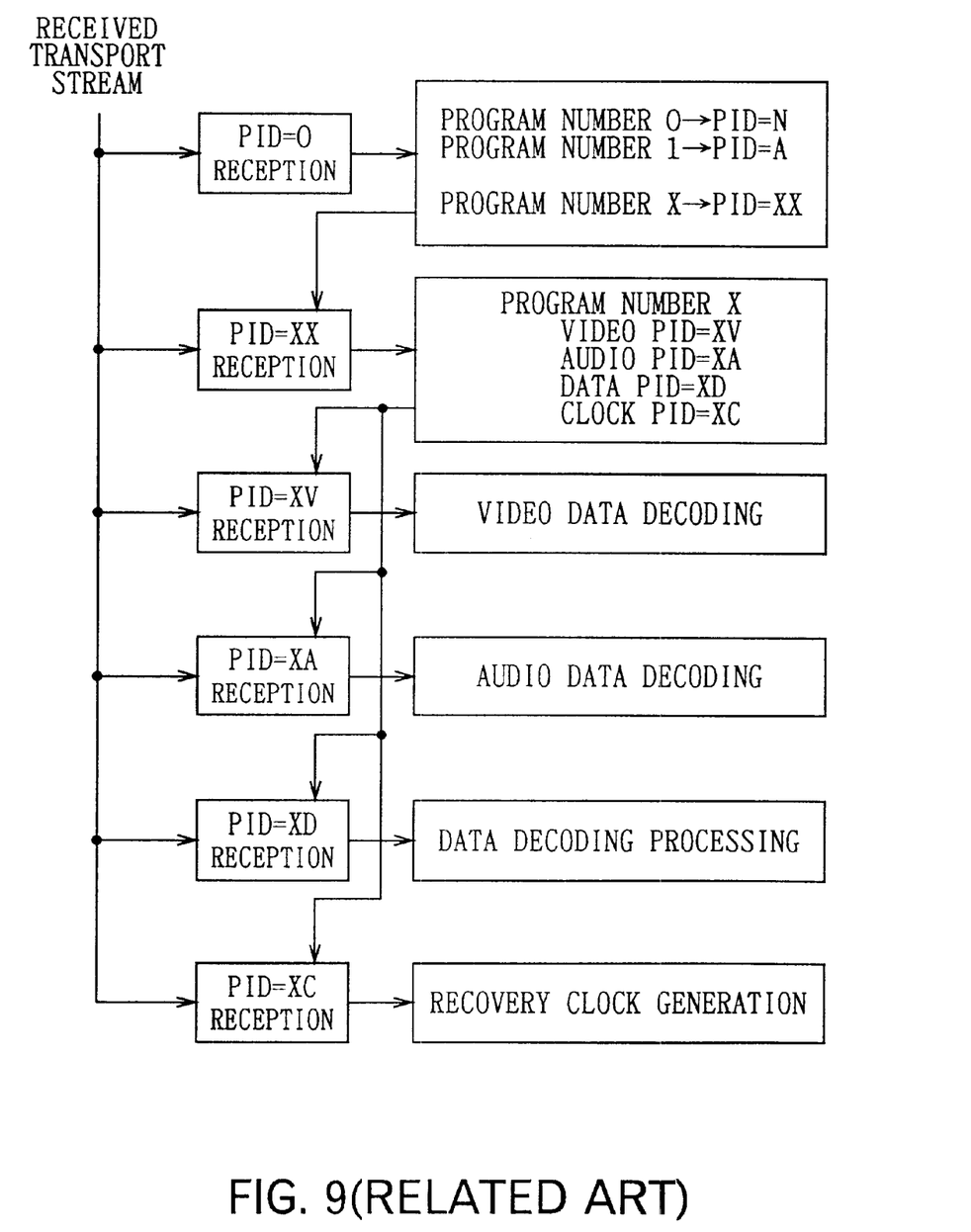
FIG. 9 is a schematic diagram explaining an algorithm of program selection.

At this point, an algorithm in the case of selecting a desired program in the receiving device 3 based on the program information PAT and PMT will be described below with reference to FIG. 9. First, in the receiving device 3, after turning the power source ON, the TS packet having the packet identification information PID "0" is extracted from the transport stream received to obtain the program information PAT. At this point, if a request to display the program having the program number "X" is entered by the user, the receiving device 3, referring to this program information PAT, investigates the packet identification information PID of TS packet in which the program information PMT having the program number "X" is stored. In this case, since the TS packet in which the program information PMT having the program number "X" is stored has the packet identification information PID "XX", the receiving device 3 extracts the TS packet having the packet identification information PID "XX" from the transport stream received to obtain the program information PMT concerning the program number "X".

The receiving device 3, by referring to the program information PMT obtained, can grasp the TS packet in which each data associated with the program number "X" is stored. Thus, the receiving device 3 obtains and decodes coded video data having the program number "X" by extracting the TS packet having the packet identification information PID "XV" from the transport stream received. Simultaneously, the receiving device 3, by extracting the TS packet having the packet identification information PID "XA" from the transport stream, obtains and decodes the coded audio data having the program number "X". Moreover, in tandem with the video and audio decoding processing, the receiving device 3, by extracting the TS packet having the packet identification information PID "XD" from the transport stream received, obtains and decodes text data on the program number "X". Simultaneously, by extracting the TS packet having the packet identification information PID "XC", the receiving device 3 obtains clock information on the program number "X" and generates a recovery clock to become the reference for decoding processing and display-output based on the clock information. In this connection, the recovery clock is necessary for decoding video data and audio data, in the strict sense, the generating processing of the recovery clock is to be started first.

Accordingly, the receiving device 3, firstly, obtains the program information PAT which is equivalent to a table of contents, and then referring to the program information PAT, obtains the program information PMT showing the details of a program requested by a user and referring to the program information PMT, obtains coded video data and coded audio data concerning the requested program. With this arrangement, even in the case where multiple programs are multiplexed in one transport stream, the requested program can be reproduced and sent out.

At this point, the generating processing of recovery clock described above will be explained more concretely. The generating processing of the recovery clock is generally called as PCR recovery and is for recovering the clock used in the transmission device 2, in the receiving device 3. In the transmission device 2, the encoding processing for video data and audio data are conducted in synchronism with 27 MHz clock. In the receiving device 3, the same clock as the clock at the time of the encoding processing is reproduced and the decoding processing and the display-output are conducted at the timing specified by the transmission device 2, in order to correctly reproduce video data and audio data without excess or lack of data.

Figure 10:
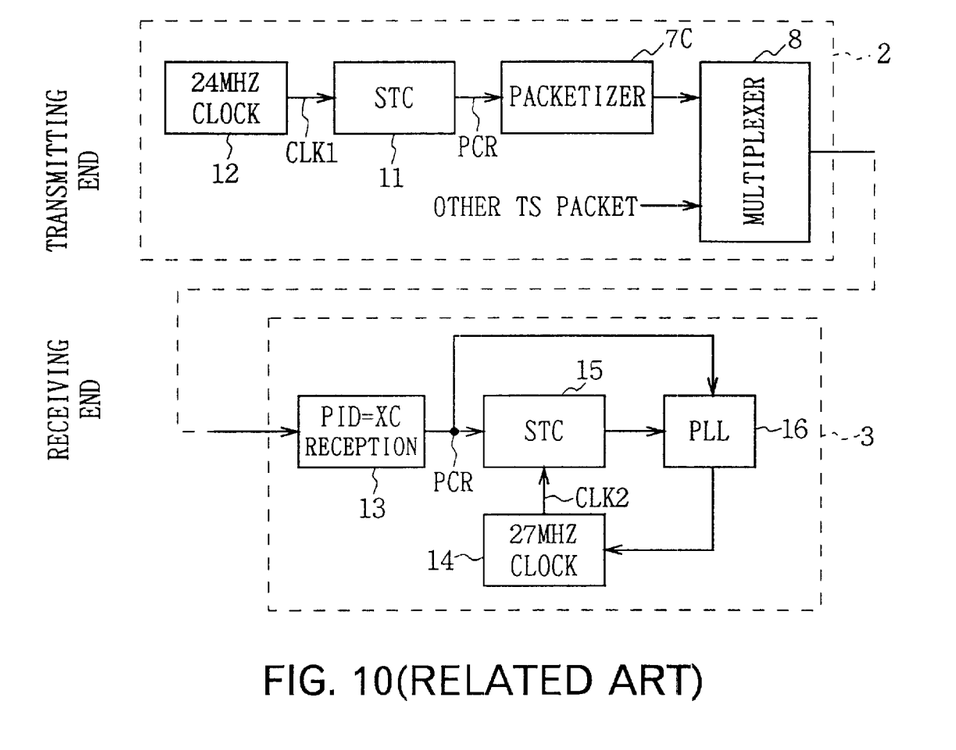
FIG. 10 is a block diagram explaining the clock recovery method in the receiving device.

Accordingly, in the digital broadcasting system 1, clock synchronization is to be conducted by the processing described as follows in the receiving side. As shown in FIG. 10, a counter 11 called as a system time clock (STC) is provided in the transmission device 2. This counter (STC) 11 is formed of 33-bit counter, and by conducting the counting operation with 27 MHz clock CLK1, which is generated in the clock generator 12 and becomes the reference clock for the encoding processing, can count 24 hours. In the transmission device 2, making the count value of the counter (STC) 11 as clock information PCR, the packetizer 7C TS-packetizes at a fixed cycle. The multiplexer 8 multiplexes and transmits the TS packet consisting the clock information PCR together with other TS packets such as video and audio. Note that, the packet identification information PID of the clock information to be regulated by the aforementioned program information PMT is added to the TS packet including the clock information PCR. Accordingly, the receiving device 3, by referring to the program information PMT, can extract the TS packet in which the clock information PCR on that program is included.

The receiving device 3, referring to the program information PMT described above, extracts the TS packet in which the clock information PCR is included. In the example shown in FIG. 8, since the packet identification information PID of the clock information is "XC", the TS packet having the packet identification information PID "XC" is extracted by the demultiplexer 13. The receiving device 3 has a counter (STC) 15 which conducts the counting operation at 27 MHz clock CLK2 generated in the clock generator 14, and sets the clock information PCR included in the extracted TS packet to the counter (STC) 15 as an initial value, and makes the counter (STC) 15 to count operate based on the clock CLK2. Then, obtaining the difference between the clock information transmitted at a fixed cycle and the count value of the counter (STC) 15, and by controlling the operation of the clock generator 14 by a phase locked loop (PLL) 16 based on the difference, the receiving device 3 forms a clock CLK2 of which phase and frequency completely conform with that of the clock CLK1 generated in the transmitting side. Thus, by transmitting the clock information PCR from the transmission device 2 and controlling the operation of the clock generator 14 based on the clock information PCR in the receiving device 3, the clock CLK2 having the same frequency and phase as the transmitting side can be reproduced in the receiving device 3 and the operation of the counter (STC) 15 can be synchronized with the operation of the transmitting side.

In the transmission device 2 of the transmitting side, in the case of forming the PES packet, the time information PTS to regulate the timing of reproduction and output of video or audio data contained in the PES packet is added. And the decoding processing is conducted at the timing based on the time information PTS, in order to synchronize video and audio without excess or lack of data. Accordingly, the receiving device 3 takes out the time information PTS added when PES packetizing, from the TS packet received, compares the time information PTS to the value of its own counter (STC) 15, and starts the decoding processing at the timing when these values coincide.

Figure 11:
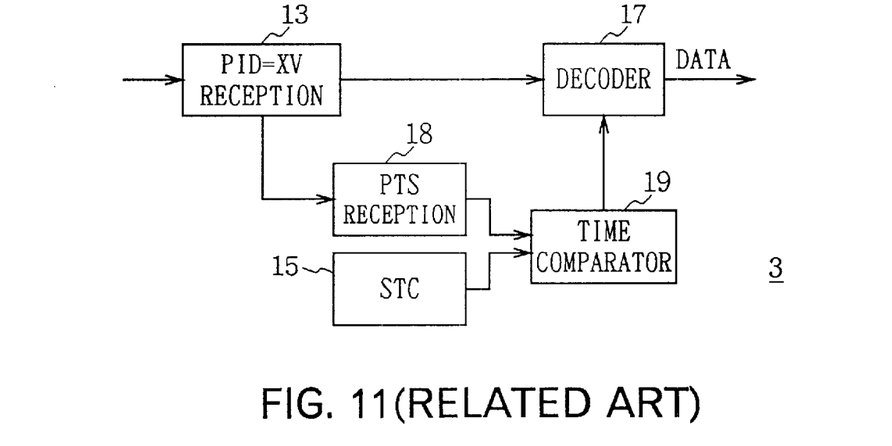
FIG. 11 is a block diagram explaining the decoding timing control method in the receiving device.

For example, in the case of decoding video data of the program in the example shown in FIG. 8, firstly the demultiplexer 13 takes out the TS packet having the packet identification information PID "XV" from the transport stream received, and restores PES packet from the TS packet and transmits this to the decoder 17, as shown in FIG. 11. Moreover, the demultiplexer 13 transmits the PES packet to the PTS receiving unit 18. The PTS receiving unit 18 extracts time information PTS from the PES packet and transmits this to a time comparator 19. The count value of the counter (STC) 15 is also supplied into the time comparator 19, and the time comparator 19 compares the count value of the counter (STC) 15 to the value of time information PTS supplied from the PTS receiving unit 18. If these count values coincide, the timing information showing the decoding start timing is transmitted to the decoder 17. With this arrangement, in the decoder 17, by starting to decode the PES packet based on this timing information, the decoding processing can be conducted at the timing specified by the time information PTS and the video data can be output at the timing in synchronism with the audio data, the occurrence of excess or lack of data can be prevented.

Note that, in the case of video data, a horizontal synchronizing signal and a vertical synchronizing signal are needed when displaying video. These horizontal and vertical synchronizing signals are to be formed based on the timing relative to the time information PTS in the decoder 17.

In the conventional digital broadcasting system 1 constructed as described above, video and audio data for multiple programs can be transmitted. However, as to each program, only one video data can be transmitted. Even in one program, if a plurality of video data associated with the program can be transmitted, it is considered that the usability of the digital broadcasting system can be further improved. For example, in the case where the program A is a concert program of a prescribed musician, if the low angle video data obtained by photographing the concert from the lower part, the middle angle video data obtained by photographing the concert from the front, and the high angle video data obtained by photographing the concert from the upper part can be transmitted as the video data of the program A, the user can select desired video data among the plurality of video data of the program A to view the program that fits to his taste. Thus, it is considered that the usability can be further improved.

In order to transmit a plurality of video data for one program, the conventional digital broadcasting system 1 treats the plurality of video data which are originally one program, as separate programs, and multiplexes and transmits them as the separate programs respectively. For example, if the video data of middle angle program A is transmitted as a program A, the video data of low angle program A is transmitted as a program B, and the video data of high angle program A is transmitted as a program C, desired video data can be selected according to the principle of program selection described above. However, if these were treated merely as the separate programs, when shifting the video data from middle angle to high angle video data, it is necessary to obtain the program information PMT whenever the video data are shifted because these are different programs. Therefore, the reception processing becomes complicated, and there is a possibility that it cannot be shifted to another video data immediately. Moreover, in the case where the plurality of data are treated as separate programs, programs cannot be synchronized with each other. Thus, there is a possibility that video data does not continue when the video data is shifted.

SUMMARY OF THE INVENTION

In view of the foregoing, an object of this invention is to provide a video transmission device and its method capable of transmitting a plurality of video data associated with one program without a complicated reception processing.

The foregoing object and other objects of the invention have been achieved by the provision of a video transmission device and its method. In the present invention, a plurality of associated video data is encoded respectively and then, different packet identification information is added to each coded video data to packetize the coded video data. And in order to control the plurality of associated video data as one program, first program information to show the packet identification information added to coded video data respectively, per video data is formed, and proper packet identification information is added to the first program information to packetize the first program information. Then, by multiplexing packets concerning each video data and the first program information, first transmission data for one program is formed. Further, the first transmission data, the second transmission data formed of a different program, and second program information to show the packet identification information added to the first program information of each program to be transmitted, per program are multiplexed in order to form and transmit third transmission data through the predetermined circuit.

In this way, in the case of transmitting a plurality of associated video data, since the first program information for controlling the plurality of associated video data as one program is formed and transmitted, video data can be shifted without receiving program information whenever shifting video data, like the conventional case in which associated video data are transmitted as separate programs. Thus, the processing of the receiving side can be simplified.

The nature, principle and utility of the invention will become apparent from the following detailed description when read in conjunction with the accompanying drawings in which like parts are designated by like reference numerals or characters.

DETAILED DESCRIPTION OF THE EMBODIMENT

Figure 12:
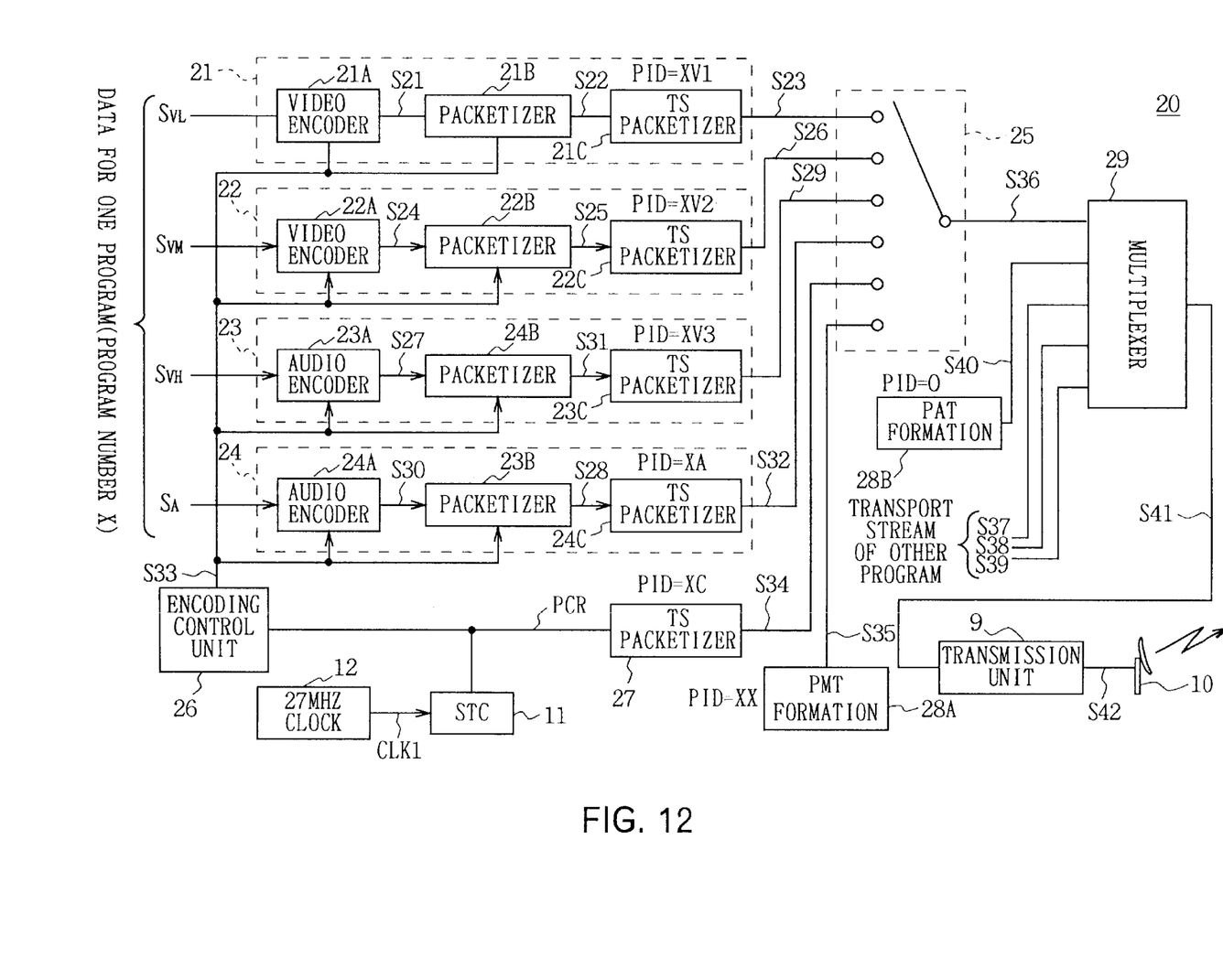
FIG. 12 is a block diagram showing the construction of a transmission device of a digital broadcasting system according to the present invention.

Preferred embodiments of this invention will be described with reference to the accompanying drawings:

In FIG. 12, 20 generally shows a transmission device of a digital broadcasting system according to the present invention, which is to transmit a plurality of associated video data $S_{VL}$, $S_{VM}$ and $S_{VH}$ as one program. More specifically, in the transmission device 20, low angle video data $S_{VL}$ obtained by photographing a concert by a prescribed musician from the lower part (hereinafter, referred to as first video data) is entered into a first video encoding unit 21, and middle angle video data $S_{VM}$ obtained by photographing the concert from the front (hereinafter, referred to as second video data) is entered into a second video encoding unit 22, and high angle video data $S_{VH}$ obtained by photographing the concert from the upper part (hereinafter, referred to as third video data) is entered into a third video encoding unit 23, and audio data $S_A$ accompanying the video data $S_{VL}$, $S_{VM}$ or $S_{VH}$ is entered into an audio encoder 24.

In the first video encoding unit 21, firstly the first video data $S_{VL}$ supplied is entered into a video encoder 21A. The video encoder 21A successively compress-encodes the first video data $S_{VL}$ based on the MPEG2 video encoding system described in the International Standards Regulation ITU-T Recommendation H.262 ISO/IEC13818-2, and outputs a stream of the resultant coded video data S21 to a packetizer 21B.

In this connection, the video encoder 21A conducts the encoding processing with video data for several pictures which are called GOP as a coding unit in the case of encoding the first video data $S_{VL}$, similarly to the case shown in FIGS. 3A and 3B, and by adding a header consisting of each parameter information at the time of encoding to the head of the coded video data, forms coded video data S21.

Figure 4A:
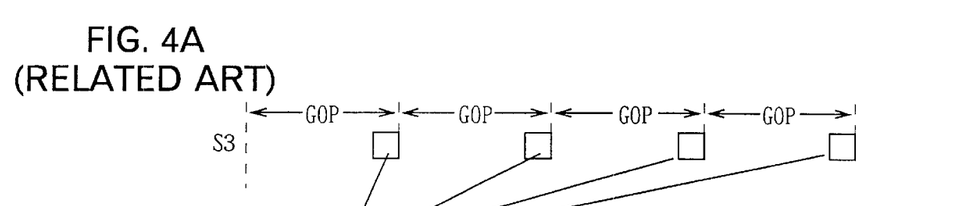
FIGS. 4A and 4B are schematic diagrams explaining the video data PES packetization.
Figure 4B:
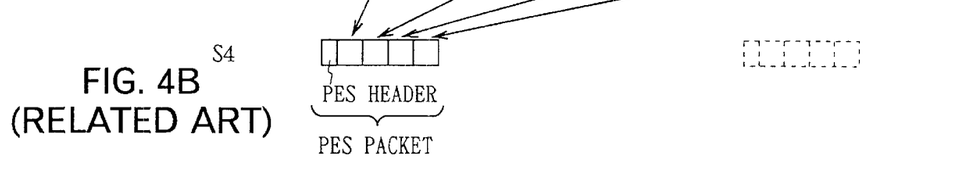

The packetizer 21B, similarly to the case shown in FIGS. 4A and 4B, connecting a fixed number of ES packets of the coded video data S21 encoded per GOP and adding a PES header to its head, PES-packetizes the coded video data S21 and outputs the PES-packetized coded video data S22 to a TS packetizer 21C. In this case, the PES header includes time information PTS for reproducing and outputting the video data at the receiving side.

The TS packetizer 21C divides each PES packet of the coded video data S22 per 184 bytes similar to the example shown in FIG. 5, and forms a TS packets by adding a TS header of 4 bytes to each of their heads, and outputs a stream of the TS packets S23 to a multiplexer 25 of the succeeding stage. Also in this case, the TS header is formed of synchronization information and packet identification information PID. In this connection, this TS packetizer 21C, by adding the packet identification information PID whose value is "XV1" to the TS packet formed, shows the TS packet is associated with the first video data.

Similarly, in the second and the third video encoding units 22 and 23, the second and the third video data $S_{VM}$ and $S_{VH}$ are encoded per GOP by video encoder 22A and 23A to form coded video data S24 and S27, respectively. The coded video data S24 and S27 are PES-packetized by following TS packetizers 22C and 23B to form coded video data S25 and S28, respectively. Then, the coded video data S25 and S28 are TS-packetized by following TS packetizers 22C and 23C respectively, and the resulting TS packet streams S26 and S29 are sent out to the multiplexer 25 of the succeeding stage. The TS packetizers 22C and 23C, by adding the packet identification information PID having values "XV2"

and "XV3" to the TS packets formed respectively, shows that the TS packets are in associated with the second and the third video data $S_{VM}$ and $S_{VH}$ respectively.

On the other hand, in the audio encoding unit 24, the audio data $S_A$ supplied is firstly entered into an audio encoder 24A. The audio encoder 24A encodes the input audio data $S_A$ based on the audio encoding system described in the International Standards Regulation ITU-T Recommendation H.262 ISO/IEC13818-3, and outputs the resultant coded audio data S30 to a packetizer 24B. Also, the audio encoder 24A encodes the audio data $S_A$ per fixed number of samples that is called an audio frame, similarly to the case of video data shown in FIGS. 3A and 3B, and by adding a header consisting of each parameter information at the time of encoding to its head, forms ES-packetized coded audio data S30.

The packetizer 24B, by connecting a fixed number of ES packets of the coded audio data S30 encoded per audio frame and adding a PES header to the head of its packet, PES-packetizes the coded audio data S30 and sends out the PES-packetized coded audio data S31 to a TS packetizer 24C.

Figure 5A:
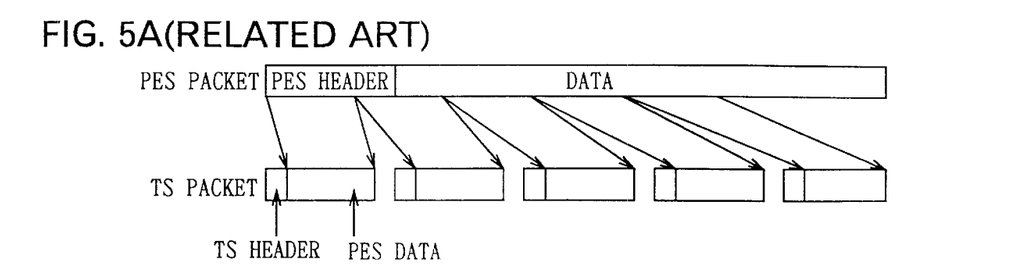
FIGS. 5A and 5B are brief linear diagrams explaining the TS packet forming method.
Figure 5B:
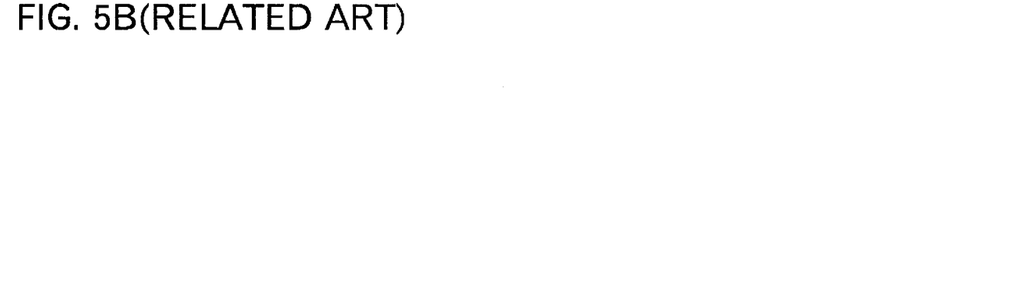
Figure 6A:
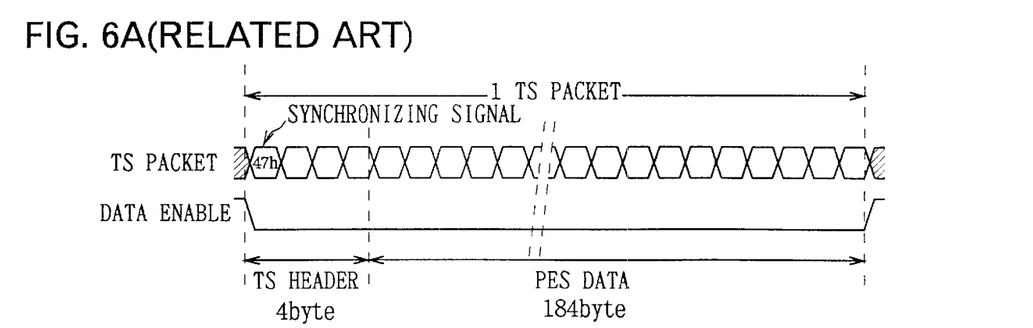
FIGS. 6A and 6B are timing charts showing the timing of TS packet.
Figure 6B:
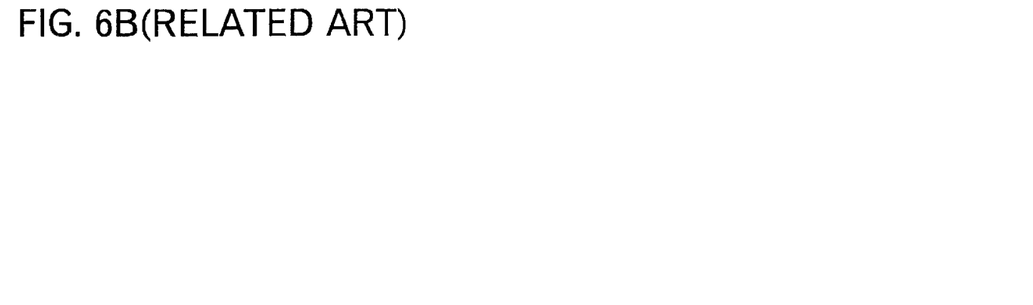

The TS packetizer 24C divides each PES packet of the coded audio data S31 per 184 bytes as in the case shown in FIGS. 5A and 5B, and by adding a TS header of 4 bytes to each of their heads, forms a TS packet, and transmits a stream of the TS packets S32 to the multiplexer 25 of the succeeding stage. Also in this case, the TS header consists of synchronization information and packet identification information PID. In this connection, the TS packetizer 24C, by adding the packet identification information PID having the value "XA" to the TS packet formed, shows that the TS packet is associated with the audio data $S_A$.

An encoding control unit 26 provided in the transmission device 20 controls the overall operations of the video encoders 21A to 23A and packetizers 21B to 23B of the video encoding unit 21 to 23 and the audio encoder 24A and the packetizer 24B of the audio encoder 24. More precisely, the encoding control unit 26 can make these circuit start all at once by transmitting a control signal S33 to the video encoders 21A to 23A, the audio encoder 24A and the packetizers 21B to 24B.

Figure 13A:
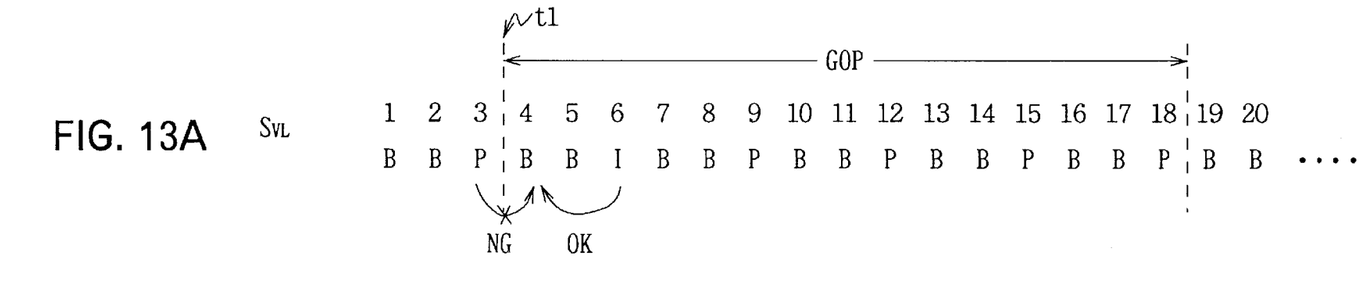
FIGS. 13A and 13B are schematic diagrams explaining GOP sequence of each video data.
Figure 13B:
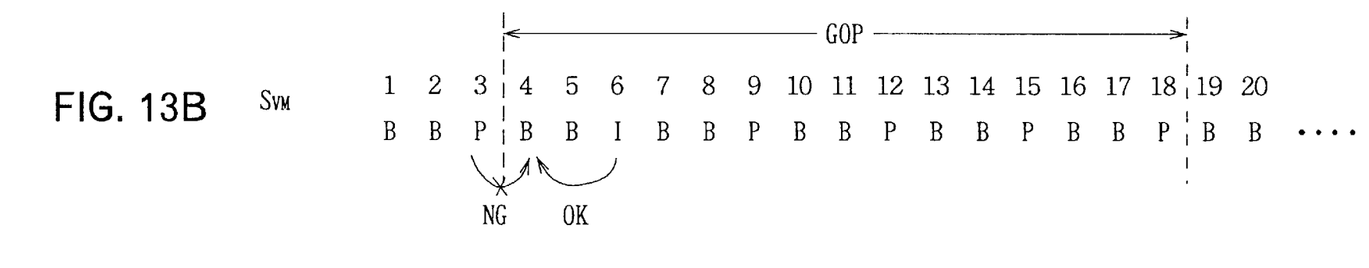
Figure 13C:
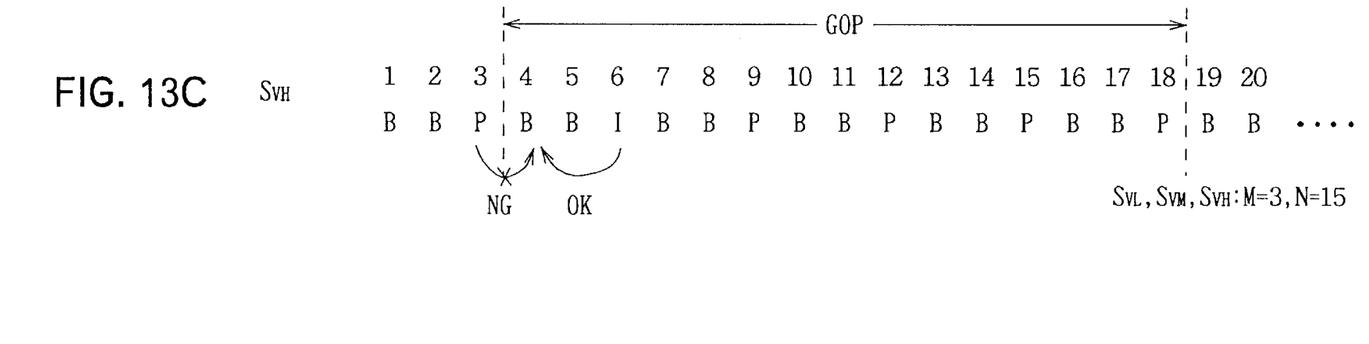

Furthermore, the encoding control unit 26 sets the video encoders 21A to 23A so that their parameters at the time of encoding become the same, using the control signal S33. More specifically, as shown in FIGS. 13A to 13C, the encoding control unit 26 sets the video encoders 21A to 23A so that the cycle M of P-picture and cycle N of I-picture at the time of encoding become the same, and simultaneously, so that the phases of GOPs to video data $S_{VL}$, $S_{VM}$, and $S_{VH}$ synchronize with each other. Moreover, the encoding control unit 26 sets the GOP to be used in each of the video encoders 21A to 23A so that the reference relationship of pictures is completed within each GOP, that is, becomes a closed GOP. To be more precise, the closed GOP, as shown in FIGS. 13A to 13C, in the case of encoding B-picture placed at the head of each GOP (B-picture having the picture numbers 4 and 5 in this example), the encoding by the forward direction prediction that makes P-picture existing in the preceding other GOP as the reference picture is not conducted, but the encoding by the backward direction prediction that makes I-picture existing in the same GOP as the reference picture is conducted. Accordingly, by conducting the encoding processing in the closed GOP, if the video data $S_{VL}$ is shifted to the video data $S_{MV}$ at the time point t1 in the receiving device side, for example, since the reference picture exists in the same GOP, the failure in reproduced picture can be prevented in advance.

Furthermore, the encoding control unit 26, by transmitting the control signal S33 to the packetizers 21B to 13B, controls the PES packetizing processing so that the head of data part of the PES packet becomes GOP (i.e., the GOP does not cross over different PES packet), and simultaneously, the encoding control unit 26 assigns the time information PTS to the packetizers 21B to 23B referring to the count value of the counter (STC) 11 so that the time information PTS to be added at the time when PES packetizing become equal among the first to third video data $S_{VL}$, $S_{VM}$ and $S_{VH}$.

In this connection, since the audio has the encoder different from that of the video, the encoding control unit 26 originally controls the audio encoder 24A and the packetizer 24B.

The counter (STC) 11 conducts the counting operation at 27 MHz clock CLK1, that is the reference clock for the encoding processing. The count value of this counter (STC) 11 is transmitted to a TS packetizer 27 at a fixed cycle as clock information PCR. The TS packetizer 27 successively TS-packetizes the clock information PCR transmitted at the prescribed cycle, and transmits a sequence of the TS packets S34 to the multiplexer 25. In this case, the TS packetizer 27, adding the packet identification information PID having the value "XC" to the TS packet formed, shows that the TS packet is associated with the clock information PCR.

Figure 14:
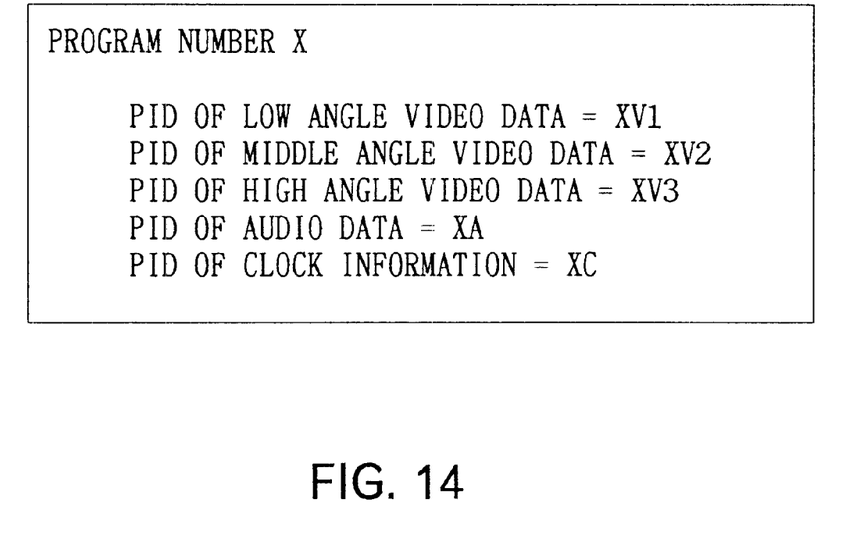
FIG. 14 is a schematic diagram showing program information PMT to be generated in the transmission device.

A PMT forming unit 28A is program information forming means for forming program information PMT of lower hierarchy arranged per program, in which the program information PMT for one program consisting of the first or the third video data $S_{VL}$, $S_{VM}$ and $S_{VH}$ and the audio data $S_A$ and the clock information PCR is formed. The program information PMT, as shown in FIG. 14, assuming that a program number of the program is "X", the packet identification information PID of TS packet in which data comprising the program is stored, per each data. More specifically, the packet identification information PID of the TS packet in which the low angle first video data $S_{VL}$ is stored is "XV1", and the packet identification information PID of the TS packet in which the middle angle second video data $S_{VM}$ is stored is "XV2". Further, the packet identification information of the TS packet in which the high angle third video data $S_{VH}$ is stored is "XV3", the packet identification information of the TS packet in which the audio data $S_A$ is stored is "XA", and the packet identification information PID of the TS packet in which the clock information PCR is stored is "XC".

The PMT forming unit 28A, after forming the program information PMT having such data, packetizes the information and sends out a sequence of the resultant TS packets S35 related to the program information PMT to the multiplexer 25. The PMT forming unit 28A adds the packet identification information PID having the value "XX" to the TS packet formed, in order to show that the TS packet is related to the program information PMT.

The multiplexer 25 is multiplexing means, in which by sequentially selecting and outputting TS packet streams S23, S26, S29 S32, S34 and S35 to be supplied from circuit blocks respectively in a certain order, one multiplexed transport stream S36 for one program is formed and transmitted. Note that, buffer circuits not shown are provided in inputs of the multiplexer 25 respectively. The buffer circuits temporarily store the TS packet sequences S23, S26, S29, 532, S34, and S35 respectively, in order to selectively output them in a prescribed order.

In the second multiplexer 29, transport streams S37 to S39 concerning the other programs formed with the same method as the transport stream S36 are entered. Moreover, a TS packet sequence S40 concerning the program information PAT formed at the PAT forming unit 28B is also entered into the second multiplexer 29.

In this case, the PAT forming unit 28B is the program information forming means for forming the program information PAT of the higher hierarchy showing the TS packet in which program information PMT formed per program are stored, in which program information PAT on all programs to be multiplexed by the second multiplexer 29 are formed. The program information PAT are arranged according to program numbers similarly to the example shown in FIG. 7; the packet identification information PID of the TS packet storing program information PMT on the program number "0" is "N", the packet identification information PID of the TS packet storing the program information PMT concerning the program number "1" is "A", and the packet identification information PID of the TS packet storing the program information PMT concerning the program number "X" is "XX".

The PAT forming unit 28B, after forming the program information PAT having such data, TS-packetizes this and transmits the resultant TS packet sequence S40 concerning the program information PAT to the second multiplexer 29. The PAT forming unit 28B adds the packet identification information PID having the value "0" to the TS packet formed, in order to show that the TS packet is related to the program information PAT.

The second multiplexer 29, by successively selecting and transmitting the transport stream S36 on the program number "X" and the transport streams S37 to S39 concerning the other programs and the TS packet sequence S40 related to the program information PAT in a prescribed order, forms a transport stream S41 obtained in by multiplexing a plurality of programs into one stream, and outputs the stream S41 to the transmission unit 9 of the succeeding stage.

The transmission unit 9, after forming a transmission signal by applying the modulation processing for transmitting to the transport stream S41, forms a transmission signal S42 having a prescribed band by applying a frequency conversion processing to the transmission signal, and transmits the signal S42 toward the satellite (not shown) via an antenna 10.

Figure 15:
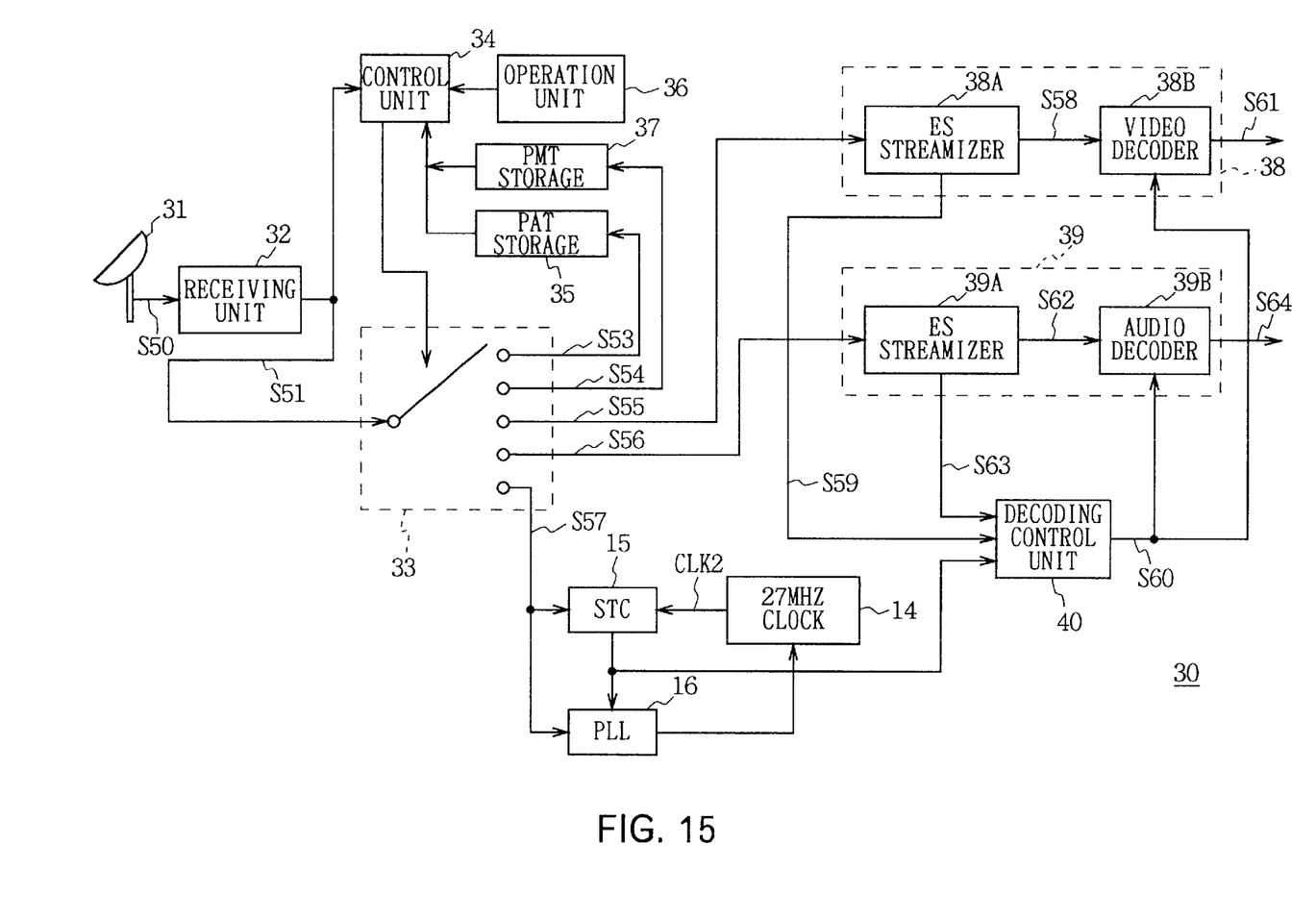
FIG. 15 is a block diagram showing the construction of a receiving device.

Then, the receiving device of the digital broadcasting system for receiving the transmission signal S42 will be described referring to FIG. 15. The transmission signal S42 relayed via the satellite is received by an antenna 31 of the receiving device 30 shown in FIG. 15, and the received signal S50 is supplied into the receiving unit 32. The receiving unit 32, by applying the frequency conversion processing and the demodulation processing to the received signal S50, restores a transport stream S51 to be transmitted from the transmission device 20 and sends this out to a demultiplexer 33 and a control unit 34.

The control unit 34 identifies the packet identification information PID of each of the TS packets included in the transport stream S51, and outputs a control signal S52 based on the packet identification information PID to control the selecting operation of the demultiplexer 33. Thereby, the desired TS packet is extracted from the transport stream S51.

More specifically, the control unit 34 makes the demultiplexer 33 extract the TS packet having the packet identification information PID value "0" and take out the TS packet S53 of the program information PAT. The TS packet S53 of the program information PAT is sent to the PAT storage unit 35. The PAT storage unit 35 analyzes the TS packet S53 and stores program information included in it in the internal memory area.

Under such conditions, at the time of requesting a desired program from the user with the operation unit 36, the control unit 34 firstly refers to the program information PAT stored in the PAT storage unit 35 based on the request. Then, the control unit 34 obtains the packet identification information PID of the TS packet storing the program information PMT of the requested program, and making the demultiplexer 33 extract the TS packet based on that packet identification information PID, in order to extract the TS packet S54 including program information PMT of the requested program. The TS packet S54 of the program information PMT is sent to the PMT storage unit 37.

The PMT storage unit 37 analyzes the TS packet S54 and stores the program information PMT included in the TS packet in the internal memory area. The control unit 34 obtains the packet identification information PID storing data forming the requested at program referring to the program information PMT stored in this PMT storage unit 37. In this case, a plurality of video data exist per one program and the packet identification information PID related to the video data $S_{VM}$ is obtained from the PMT storage unit 37 as the initial value.

The control unit 34 makes the demultiplexer 33 extract the TS packet based on the packet identification information PID obtained, in order to extract TS packets S55 to S57 storing video data $S_{VM}$, audio data $S_A$ and clock information PCR of the requested program respectively. Out of the TS packets extracted, the TS packet S55 related to the video data $S_{VM}$ is transmitted to a video decoding unit 38 and the TS packet S56 related to the audio data $S_A$ is sent out to an audio decoding unit 39, and the TS packet S57 related to the clock information PCR is transmitted to a counter (STC) 15.

The counter (STC) 15 takes out clock information PCR included in the TS packet S57 and sets this as the initial value of the counter and starts the counting operation based on 27 MHz clock CLK2. The phase-locked loop (PLL) 16 obtains the difference between the clock information PCR included in the TS packet S57 to be transmitted at the fixed intervals and the count value of the counter (STC) 15, and by controlling the clock generator 14 based on the difference, generates a clock CLK2 synchronized with the clock CLK1 of the transmission device 20, in order to synchronize the counting operation of the counter (STC) 15 with the counter (STC) 11 of the transmission device 20. Thus, the count value of the counter (STC) 15 synchronized with the transmitting side is sent out to a decoding control unit 40 for controlling the reproduction output timing.

The video decoding unit 38 firstly enters a TS packet S55 on the video to be supplied, into an internal ES streamizer 38A. The ES streamizer 38A restores the PES data by connecting the video data to be supplied after being TS-packetized, and further converts the PES data to an elementary stream S58 per coding unit and outputs the elementary stream S58 related to the video to the video decoder 38B. Moreover, the ES streamizer 38A takes out the time information PTS concerning the video included in the PES data when converting the TS packet S55 into the PES data, and outputs this to the decoding control unit 40 as a time signal S59.

The video decoder 38B starts the decoding processing for the elementary stream S58 based on the timing information S60 supplied from the decoding control unit 40, and sends out the resultant restored video data S61 to the television receiver (not shown) of the succeeding stage.

Similarly, at first, the audio decoding unit 39 supplies the TS packet S56 concerning audio supplied, to the internal ES streamizer 39A. The ES streamizer 39A restores the PES data by connecting audio data to be transmitted after being TS-packetized, further converts the PES data into an elementary stream S62 per the coding unit, and outputs the elementary stream S62 concerning the audio to the audio decoder 39B. Moreover, the ES streamizer 39A takes out the time information PTS concerning audio included in the PES data at the time of converting the TS packet S56 into the PES data, and outputs this to the decoding control unit 40 as a time signal S63.

The audio decoder 39B starts the decoding processing for the elementary stream S62 based on the timing information S66 supplied from the decoding control unit 40, and outputs the resultant restored audio data S64 to the television receiver of the succeeding stage.

The decoding control unit 40 judges whether timing of the time information PTS shown by time signals S59 and S63 have come or not, based on the time signals S59 and S63 concerning video and audio and the count value of the counter (STC) 15. When it judges that timing has come, the timing information S60 is transmitted to control the decoding start of the video decoder 38B and the audio decoder 39B.

Accordingly, the receiving device 30 obtains the program information PMT of the program requested by the user, referring to the program information PAT and then, referring to the program information PMT, takes out the TS packet of data forming the requested program and restores video and audio data S61 and S64 of the program.

By the way, a plurality of associated video data $S_{VL}$, $S_{VM}$ and $S_{VH}$ are transmitted from the transmission device 20 for one program. In the aforementioned explanation, the video data $S_{VM}$ is selected as the initial value, however, in the case where the user requests to switch to the other video data $S_{VL}$ or $S_{VH}$, these video data can be shifted easily.

For example, in the case where a request to switch to the video data $S_{VH}$ is entered with the operation unit 36, the control unit 34 obtains the packet identification PID of the TS packet storing the video data $S_{VH}$, referring to the program information PMT stored in the PMT storage unit 37, based on the request. The control unit 34 makes the demultiplexer 33 extract the TS packet based on the packet identification information PID to take out the TS packet of the video data $S_{VH}$. The TS packet S54 extracted is sent to the video decoding unit 38 to be decoded, and is transmitted as video data S61. Thus, it can easily switch to the video data $S_{VH}$ requested.

In this connection, in the case of switching the TS packet to be extracted at the demultiplexer 33, the control unit 34 switches it at the timing of the following PES data. In this case, as well as matching the head of PES data of each video data $S_{VL}$, $S_{VM}$ and $S_{VH}$ to the head of GOP, the phases of GOPs of video data $S_{VL}$, $S_{VM}$ and $S_{VH}$ Synchronize with each other. Furthermore, since individual GOP is set to the closed GOP, data failure never occurs in the reproduced picture even though it is switched to another video data. Moreover, since time information PTS and clock information PCR are available in he same program, even when it is shifted to another video data, the phase of the reproduced picture can be prevented from shifting and the continuity of the reproduced picture can be maintained.

According to the foregoing construction, the transmission device 20 of the digital broadcasting system TS-packetizes and transmits a plurality of associated video data $S_{VL}$, $S_{VM}$ and $S_{VH}$. In this case, the transmission device 20, adding different identification information PID to the TS packet of each of the video data $S_{VL}$, $S_{VM}$ and $S_{VH}$, transmits them. Moreover, the transmission device 20 forms the program information PMT to control the associated video data $S_{VL}$, $S_{VM}$ and $S_{VH}$ as one program, and also TS-packetizes and transmits the program information PMT. Moreover, in the transmission device 20, the program information PAT of the higher rank to show the TS packet storing the program information PMT of the program is also TS-packetized and transmitted.

Accordingly, in the transmission device 20, TS-packetized video data and program information PMT and PAT of each program are finally multiplexed to one transport stream S41 and transmitted to the receiving device 30 through the satellite wireless circuit. In the receiving device 30, firstly, the program information PAT of the higher rank is received, and referring to the program information PAT, the TS packet storing the program information PMT of the program requested by the user is received to obtain the program information PMT of the program requested by the user. And the receiving device 30, referring to the program information PMT, receives the TS packet of the middle angle second video data $S_{VM}$ that is set as the initial value, and conducting the decoding processing, outputs the second video data $S_{VM}$.

Under such conditions, if a command to switch to another video data $S_{VL}$ or $S_{VH}$ is entered by the user, the receiving device 30 receives the TS packet of the requested video data $S_{VL}$ or $S_{VH}$ referring to the program information PMT stored in the PMT storage unit 37 and decoding this, in order to output the requested video data $S_{VL}$ or $S_{VH}$.

In the case of this digital broadcasting system, a plurality of associated video data $S_{VL}$, $S_{VM}$ and $S_{VH}$ are TS-packetized and transmitted respectively and simultaneously, the program information PMT to control the plurality of associated video data $S_{VL}$, $S_{VM}$ and $S_{VH}$ as one program is TS-packetized and transmitted, so that the receiving side can easily switch the video data $S_{VL}$, $S_{VM}$ and $S_{VH}$ referring to the program information PMT, once the receiving side receives the program information PMT. In the case where associated video data $S_{VL}$, $S_{VM}$ and $S_{VH}$ are transmitted as separate programs as before, it is necessary to get the program information PMT whenever switching video data because the program information PMT is formed per program. Accordingly, there was that the processing of the receiving side became complicated. However, if the program information PMT to control the associated video data $S_{VL}$, $S_{VM}$ and $S_{VH}$ as one program is transmitted, all packet identification information PID of the associated video data $S_{VL}$, $S_{VM}$ and $S_{VH}$ can be grasped and thus, such problem can be solved.

Furthermore, in the case of encoding the plurality of associated video data $S_{VL}$, $S_{VM}$ and $S_{VH}$, the encoding processing to synchronize the coding unit at the time of encoding between these video data $S_{VL}$, $S_{VM}$ and $S_{VH}$ within the coding unit is conducted, so that the failure of the reproduced picture when switching the video data $S_{VL}$, $S_{VM}$ and $S_{VH}$ can be prevented.

Furthermore, in the case of encoding the associated video data $S_{VL}$, $S_{VM}$ and $S_{VH}$, the timing information PTS to regulate the timing at the time of reproduction-output are to become equal among the video data $S_{VL}$, $S_{VM}$ and $S_{VH}$, the phase of the reproduced picture can be prevented from shifting when switching the video data $S_{VL}$, $S_{VM}$ and $S_{VH}$ and the continuity of the reproduced picture can be maintained.

According to the foregoing construction, since a plurality of associated video data $S_{VL}$, $S_{VM}$ and $S_{VH}$ are TS-packetized and transmitted, and simultaneously, the program information PMT to control the plurality of associated video data $S_{VL}$, $S_{VM}$ and $S_{VH}$ as one program is TS-packetized and transmitted. Thereby, a plurality of video data $S_{VL}$, $S_{VM}$ and $S_{VH}$ associated with one program can be easily transmitted without conducting a complicated processing.

Note that, in the aforementioned embodiment, a plurality of associated video data $S_{VL}$, $S_{VM}$ and $S_{VH}$ is transmitted as one program. However, the present invention is not only limited thereto and a plurality of associated audio data can be transmitted as one program. In the case of transmitting the plurality of associated audio data as one program, similarly to the case of the video data, a plurality of associated audio data is encoded and TS-packetized respectively, TS packets of the plurality of associated audio data are multiplexed and transmitted, and program information PMT to control the associated audio data as one program is TS-packetized and transmitted. Thereby, the same effects as those of the video data can be obtained.

Moreover, in the aforementioned embodiment, an account method is not described. However, video data $S_{VL}$, $S_{VM}$ and $S_{VH}$ are scrambled using a secret key respectively, and the receiving side removes the scramble using the secret key corresponding to the received video data, so that fee can be charged per each secret key used. With this arrangement, the fee can be charged per video data even though video data are the same one program. Moreover, fee can be charged per program by applying the scramble to video data $S_{VL}$, $S_{VM}$ and $S_{VH}$ using the same secret key.

Furthermore, in the embodiment described above, the video data $S_{VM}$ out of associated video data $S_{VL}$, $S_{VM}$ and $S_{VH}$ is reproduced and outputted as the initial value. However, the present invention is not only limited thereto and another video data $S_{VL}$ or $S_{VH}$ can be transmitted as the initial value.

Furthermore, in the embodiment described above, video data $S_{VL}$, $S_{VM}$ and $S_{VH}$ each having the different photographic direction are transmitted as the associated video data. However, the present invention is not only limited thereto and main video data, and sub video data to provide supplemental remarks to the main video data, such as by the sign language can be transmitted. Thereby, the same effects as those of the above can be obtained.

Moreover, in the embodiment described above, the transport stream S41 formed finally is transmitted through the satellite wireless circuit. However, the present invention is not only limited thereto this and a transport stream can be transmitted through a terrestrial wireless circuit and a cable circuit. In short, the present invention can be widely applied as long as the transmission device transmits a finally formed transport stream through a prescribed transmission path.

According to the present invention as described above, in the case of transmitting a plurality of associated video data, the first program information to control the plurality of associated video data as one program is formed and transmitted, so that a plurality of video data associated with one program can be transmitted without a complicated processing at the time of reception.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video transmission device comprising:

a plurality of video encoding means for encoding a plurality of associated video data and for adding different packet identification information to the coded video data respectively to packetize and output them;

program information forming means, in order to control said plurality of associated video data as one program, for forming first program information to show said packet identification information, which are added to said coded video data respectively, per video data and for adding proper packet identification information to the first program information to packetize and output it;

first multiplexing means for multiplexing packets concerning each of video data to be transmitted from said plurality of video encoding means onto packets of said first program information to be transmitted from said program information forming means, and for outputting first transmission data for one program;

second multiplexing means for multiplexing said first transmission data to be transmitted from said first multiplexing means and second transmission data formed of another program onto second program information showing said packet identification information, which is added to said first program information of each program to be transmitted, per program, and for outputting third transmission data; and transmission means for transmitting said third transmission data to be transmitted from said second multiplexing means through a prescribed circuit.

2. The video transmission device according to claim 1, further comprising a plurality of audio encoding means for encoding a plurality of associated audio data and for adding different packet identification to the coded audio data respectively to packetize and output them; wherein said program information forming means, as well as showing said packet identification information, which are added to said coded video data respectively, per video data, forms said first program information showing said packet identification information, which are added to said coded audio data respectively, per audio data.

3. The video transmission device according to claim 1, wherein said plurality of video encoding means, as well as encoding video data so that coding units synchronize between the video data, applies such an encoding as finishes within the coding unit, to said video data.

4. The video transmission device according to claim 1, wherein said plurality of video encoding means, as well as adding time information to regulate a processing timing at a decoding side, to each of said coded video data, makes the time information to be equal among the video data.

5. A video transmission method, comprising the steps of:

as well as encoding a plurality of associated video data, adding different packet identification information to the coded video data respectively to packetize them;

in order to control said plurality of associated video data as one program, forming first program information to show said packet identification information, which are added to said coded video data respectively, per video data and adding proper packet identification information to the first program information to packetize it;

forming first transmission data for one program by multiplexing packets concerning said video data onto packets for said first program information; and forming third transmission data by multiplexing said first transmission data, second transmission data formed of another program onto second program information showing said packet identification information, which is added to said first program information of each program to be transmitted, per program, and transmitting the third transmission data through a prescribed circuit.

6. The video transmission method according to claim 5, wherein:

a plurality of associated audio data is encoded, and different packet identification information are added to coded audio data respectively to packetize the coded audio data; and said packet identification information, which are added to said coded video data respectively, are showed per video data, and said first program information showing said packet identification information, which are added to said coded audio data respectively, per audio data is formed.

7. The video transmission method according to claim 5, wherein encoding is applied to video data so that coding units synchronize between the video data, and such an encoding as finishes within the coding unit is applied to said video data to respectively.

8. The video transmission method according to claim 5, wherein in the case of encoding said video data, time information to regulate a processing timing of a decoding side is added to each of said coded video data, and the time information is to be equal among the video data.

* * * * *